Aug. 24, 1965

H. BENTELER ETAL 3,201,966

APPARATUS FOR THE EXTRUSION PRESSING OF
TUBES, ESPECIALLY STEEL TUBES

Filed May 23, 1962

INVENTORS:
Helmut Benteler
Wilfried Vogel by:
Michael S. Striker
A. Tony

INVENTORS:
Helmut Benteler
Wilfried Vogel by:
Michael J. Striker
Atty

United States Patent Office 3,201,966
Patented Aug. 24, 1965

3,201,966
APPARATUS FOR THE EXTRUSION PRESSING OF TUBES, ESPECIALLY STEEL TUBES
Helmut Benteler, Bielefeld, and Wilfried Vogel, Paderborn, Germany, assignors to Benteler-Werke Aktiengesellschaft, Kreis Paderborn, Germany, a firm
Filed May 23, 1962, Ser. No. 197,071
Claims priority, application Germany, May 23, 1961, B 62,596
11 Claims. (Cl. 72—264)

To produce tubes by extrusion pressing is known. As compared with other processes of production in which, for example, a block with a hole punched at one end is subjected to a draw-bench process and the tube lump thus produced is then reduced both in wall thickness and in external diameter in warm state by continuous reduction rolling in order to still further reduce the intermediate product thus obtained by subsequent cold drawing with or without mandrel to the desired final dimensions, the extrusion pressing process has primarily the advantage of being to a great extent free of the more or less fixed ratio existing in the above-mentioned process between the wall thickness and the diameter of the finished tubes, so that it can be applied particularly advantageously to the production of extremely thick walled and also extremely thin walled tubes.

The apparatuses used for carrying out this process comprise a preferably hydraulically operated press having a pressure chamber which receives a perforated or hollow billet and is closed at its front end by a tool carrier serving as mounting for a die and further comprise a mandrel rod extending axially through the pressure chamber and the perforated insertion piece and surrounded by a press ram, said mandrel rod forming together with an aperture of the die an annular gap for forming a tube. In a known apparatus of this type the mandrel rod is arranged axially and stationary within the pressure chamber, a first portion of the mandrel rod forming a guide for the centrally perforated billet which is heated, for example, to about 1200° C., while the end section of the mandrel rod adjacent to said first portion and usually reduced in diameter constitutes the actual likewise axially stationary mandrel projecting into the aperture of the die and forming with this aperture the annular gap for forming the tube to be extruded.

This known extrusion pressing apparatus is open to the objection that the tubes produced therewith, as they pass out at a relatively high temperature, shrink considerably in cooling, they being moreover subject to extensive oxidation or scaling by the oxygen of the atmosphere whereby the quality of the surface and especially of the inner surface, which is in any case inferior because of the porous and uneven inner surface structure of the tubes, is further considerably deteriorated. To overcome these defects it is known and customary to subject the tubes produced by the extrusion pressing process to a subsequent complicated and therefore time-wasting and expensive reworking in the course of which the tubes are first pickled for the purpose of removing the scale and subsequently subjected to possibly several cold working operations in order to smooth the inner surface and to straighten and calibrate them at the same time. The improvement of the inner surface of the tube attained in this manner has, however, been found insufficient especially when the tubes are of relatively small diameter and consequently of extremely long length. In such cases it is as a rule impossible to eliminate by such reworking the damage of the surface caused by the extrusion, or at least to reduce this damage to such an extent as is necessary or desirable for many purposes of use. A typical example of use for extrusion pressed tubes are the so-called "Diesel injection tubes" which, owing to their very small internal diameter and their great wall thickness in relation thereto, can only be produced with very great difficulty by means other than by extrusion pressing, but which on the other hand require an inner surface of particularly high quality.

It is the object of the invention to overcome the aforementioned disadvantages by providing an apparatus for the extrusion pressing of tubes, especially steel tubes, which comprises a press, a pressure chamber within said press for receiving a perforated billet and having an open end, a tool carrier closing the open end of said pressure chamber, a die mounted in said tool carrier, an aperture in said die, a press ram movable into said pressure chamber from the other end thereof, an axially unshiftable guide tube provided within said press and arranged concentrically to said aperture in said die and having an end of substantially truncated-conical shape extending to near said die in said tool carrier and forming together with said die an admission funnel for the extrusion material directed towards said aperture in said die, and a mandrel rod axially slidable but concentrically guided within said guide tube and forming together with said aperture in said die an annular space for forming a tube, said mandrel rod being continually entrained by the extruded tube during the extrusion operation.

By using according to the invention a mandrel rod continually entrained by the extruded material during the extrusion or pressing operation, the advantage is obtained that the tubes are given a considerably better and especially uniformly smooth surface on the inner side and this high quality surface remains unchanged even during the cooling phase without danger of scaling. These effects are due to the fact that, on the one hand, the tube passing out from the extrusion press and thereby entraining the mandrel rod without any relative displacement, is pressed firmly on the mandrel rod while it is cooling down and thus automatically effects a smoothing of its inner surface, and, on the other hand, the snug bearing of the tube on the mandrel rod prevents the admission of atmospheric oxygen to the inner surface and therefore, in spite of the high temperatures at which the tubes leave the extrusion press, no oxidation resulting in the formation of scale can take place.

As the tubes shrink firmly on the mandrel rod during the cooling operation it is necessary to loosen them again after the extrusion pressing with the aid of reeling operations generally known for this purpose, by widening, e.g. by transversal rolling. Apart from this step, the tubes produced with the apparatus according to the invention do not as a rule require any subsequent reworking.

In conjunction with the extrusion pressing of tubes it has already been proposed by a prior suggestion intended, however, for solving other problems, to use a mandrel rod guided so that it is longitudinally slidable in the press. It has, however, been found that it was not possible to attain or ensure entrainment of the mandrel rod by the tube extruded during the extrusion operation because the friction between the mandrel rod and the billet subjected to the extrusion operation is greater than the frictional forces which tend to carry along the mandrel rod in the zone of the extruded tube. An entrainment of the mandrel rod takes place thereby only over the short distance corresponding to the shortening which the perforated billet introduced into the pressure chamber undergoes during the extrusion of the tube, said short distance being practically equal only to the axial length of the billet inserted in the press. The damage to the inner surface of the extruded tube is consequently the same as that which is caused when using a mandrel which is axially stationary in known manner.

The invention is, however, based on finding that reliable and uniform entrainment of the mandrel rod can in fact be ensured if the billet introduced into the pressing chamber comes into direct contact with the mandrel rod only in the region of the die aperture during the extrusion operation, that is in the region in which the material i.e. the extruded tube has already almost attained its exit velocity which is many times greater than the speed at which the billet is being shortened. In order to prevent direct contact between the mandrel rod and the inside of the perforated billet i.e. the material being extruded in the region in front of the die aperture, a guide tube is provided which is axially stationary within the press and concentric with the die aperture and the outer surface of the guide tube serves as a guide for the perforated billet while its inner surface serves as a means for concentrically guiding the axially shiftable mandrel rod, the truncated conical front end of the guide tube extending close to the die so that it forms therewith the admission funnel for the material directed towards the die aperture. The mandrel rod comes into contact with the material being extruded only in the region directly following the funnel, so that it is carried along by this material i.e. by the extruded tube at the speed of movement of the extruded tube. Although frictional forces occur due to the partly still lower speed of the extrusion material in the zone directly preceding the die aperture, which tend to brake the mandrel rod, it has been found, however, that the frictional forces acting on the mandrel rod in the region of the already extruded tube, due to the considerable shrinkage forces occurring immediately after the tube leaves the die, are so much greater than the forces holding back the mandrel rod that the rod is carried along during the extrusion operation right from the beginning at a speed corresponding to that of the extruded tube. This is even the case when the extruding speed of the tube and consequently the speed of the mandrel rod is, in the case of tubes of correspondingly small cross-sectional dimensions, as much as about ninety times greater than the advancing speed of the press ram.

The employment of travelling cylindrical mandrel rods is known in other processes for the production of tubes, for example in the drawing process or in the tube rolling process. This use of a travelling cylindrical mandrel rod is, however, a necessary condition for technical reasons and does not serve the purpose of producing tubes with a smooth inner surface absolutely free of pores. Where it is a case of cold working processes, for example in the form of the cold drawing process with a travelling cylindrical mandrel rod, the problem which the present invention sets out to solve does not exist because no scaling occurs in any case at the temperature range of this process. A uniform pressing of the inner surface of the tube onto a progressively moving mandrel rod certainly occurs in hot drawing and in the thrust process, but there the problem of smoothing the inner surface and avoiding the formation of scale is of no importance because these are not final operations but merely intermediate stages in the production or working of tubes in preparation for subsequent further working during which the inner surface of the tube is subjected to a further shaping and also to further scale removal. As the tube body in the case of these processes, contrary to the conditions in extrusion pressing operations, is already present in finished state before it is slipped in hot condition on to the mandrel rod, the formation of scale has moreover already commenced at this stage, whereby the surface damage caused thereby cannot only not be prevented by subsequent pressing against the mandrel rod, but even becomes still greater than can be remedied by subsequent treatment, especially pickling owing to the scale being pressed into the inner surface of the tube.

The same is, in principle, the case with the hot rolling of tubes over a travelling cylindrical mandrel rod with the object of reducing the wall thickness, when moreover the inner side of the tube bears against the mandrel rod only on a portion of its periphery so that scale formation on the inner surface cannot be avoided even during the rolling process in spite of the mandrel rod.

In all these cases an axially stationary guide tube serving for guiding the mandrel rod is neither provided nor could be used at all to attain the effect aimed at by the invention.

The apparatus according to the invention is suitable not only for the production of tubes with great wall thickness in relation to the diameter but also in particular for the production of extremely small and thin-walled tubes. As the relatively heavy billets produce in this case extremely long continuous tubelengths of more than 100 meters and tubes of this length can no longer be detached from the mandrel rod by reeling, according to an important advantageous feature of the invention the mandrel rod is composed of sections introduced sequentially at the rear end of the guide tube during the extrusion operation; these sections are coupled together by sleeves having an outer diameter corresponding to the outer diameter of the mandrel rod sections and an annular gap with sharply defined edges is provided at one end of the sleeves whereby a corresponding constriction is produced on the outside of the extruded tube through the shrinking of the tube wall after leaving the die. The annular gap may be a groove provided on the sleeves themselves. Alternatively, the annular gap may be provided between one of the end faces of each sleeve and the end face of the adjacent mandrel rod section adjacent said one end face of the particular sleeve.

In the region of each annular groove of the mandrel rod assembly the tubes undergo radial shrinkage resulting in a constriction visible from the outside as a marking during the extrusion operation, so that the tubes can easily be parted at these marked points and the lengths defined in this manner can be separated from each other for the purpose of subsequently loosening therefrom the mandrel rod sections within them by subjecting them to the conventional reeling process. When producing shorter lengths, the use of a divided mandrel rod can naturally be dispensed with.

The guide tube is preferably mounted at the rear end of the press in such a manner that it is axially adjustable so as to enable the axial distance of its front end from the die aperture and consequently from the admission funnel for the extrusion material to be varied. Advantageously, the admission funnel is formed by the truncated cone-shaped end of the guide tube and the inner surface of the die facing it and narrows towards the aperture of the die.

As the dies wear relatively quickly and must also be exchanged when changing over between production of tubes of different cross-sectional dimensions, it is advisable that these dies be exchangably mounted in the tool carrier. Furthermore, a conical guide portion is advantageously provided around the die on the tool carrier for closing the open end of the pressure chamber and said conical guide portion of the tool carrier engages the mouth of the pressure chamber. The die is lodged in said guide portion, the tool carrier is mounted to swing about a longitudinal axis in a plane transverse to the pressing direction and at least one wedge serves to lock the tool carrier in the pressing position. The tool carrier rotatable about said axis is preferably composed of at least two radial arms for the purpose of lodging in said arms exchangeable dies. Incorporated in the press may be means for automatically feeding and introducing the perforated billet into the pressure chamber and also means for ejecting the extrusion material residue from the die when the latter is not in operative position and possibly also for ejecting the die itself from the tool carrier. Finally, at least one heating device may be incorporated in the press and may have a high frequency conductor for the purpose of heating the extruded tube before and while the latter is parted by pulling action.

A preferred embodiment of the invention is illustrated by way of example and described with reference to the accompanying drawings, in which:

FIG. 1 illustrates an extrusion press which is composed of a driving part A, a press part B and a closing part C, the driving part and the press part being mounted on a common bedplate 1.

Figure 1:
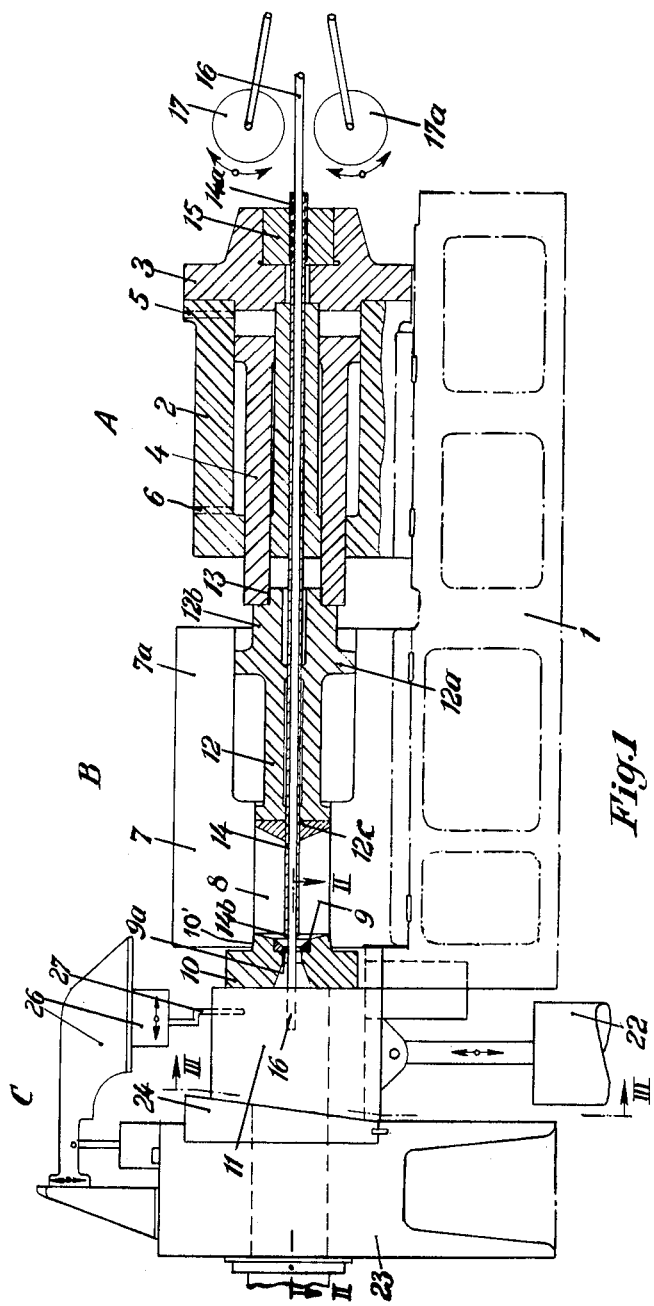
FIG. 1 is a diagrammatic side elevational view, partly in section, of an apparatus according to the invention.

In the case of the hydraulically operated driving part A, which like the press part B consists of a cylinder and a piston or ram slidable yet tightly fitted therein, 2 designates a tubular cylinder, 3 a cover detachably connected therewith and 4 a tubular piston extending through the opposite end of the cylinder 2. The alternate feeding of the cylinder 2 with the hydraulic medium entering and leaving through ports 5 and 6, respectively, is effected by a known controlling device not shown in the drawing.

The press part B consists of a press cylinder 7 with a guide portion 7a extending in rearward direction therefrom toward the driving part A, a two-arm tool carrier 10 adapted to close, when in one of its operative positions, a pressure chamber 8 which is open at its front end and engage the pressure chamber opening with either one of its conical guide parts 10′, each adapted to hold in a recess a die. The tool carrier 10 is supported from the rear in its operative position by a closing wedge 11. A press ram 12 longitudinally shiftable in the press cylinder 7, additionally guided in the guide portion 7a of the press cylinder by means of a flange portion 12a and coupled at its rear end 12b, for example by means of a screw thread at 13, with the front end of the tubular piston 4 of the driving part A projecting from the cylinder 2.

A guide tube 14 held in stationary position extends both through the driving part A and the press part B in longitidinal direction and has a threaded rear end 14a by which the guide tube 14 is secured against axial displacement in the cover 3 of the cylinder 2 yet is adjustable in axial direction by the threaded connection with an internally threaded sleeve 15 anchored in the cover 3.

The front end 14b of the guide tube 14 is of substantially truncated-conical shape and does not reach quite to the die 9 mounted in the tool carrier 10 but forms with a substantially conical recess in the die, an annular admission funnel for the material to be extruded directed and preferably narrowing towards a die aperture 9a, the axial dimension of this funnel being variable according to the actual conditions by means of the threaded connection of the rear end 14a of the guide tube 14 with the screw sleeve 15.

The guide tube 14 is concentrically guided within a central bore of the cylinder 2 as well as bores through the press arm 12 and serves for the accurate central guiding of an mandrel rod 16 axially slidable within it. This mandrel rod, in conjunction with the die aperture 9a, forms the annular gap for moulding the material to be extruded into tube shape. The rod 16 extends from the admission funnel through the die aperture 9a and, being loosely guided within the guide tube 14, is carried along progressively by the material to be extruded and/or the extruded tube.

A truncated conical ram head exchangeably mounted on the press ram 12 is designated by 12c and composed, like the other highly stressed parts of the press, of a special heat-resisting steel alloy. Driving rollers arranged in front of the extrusion press are designated by 17 and 17a and serve, when in engagement with a mandrel rod, for introducing the mandrel rod 16 into the press before the extrusion operation and for withdrawing it thereafter.

Figure 2:
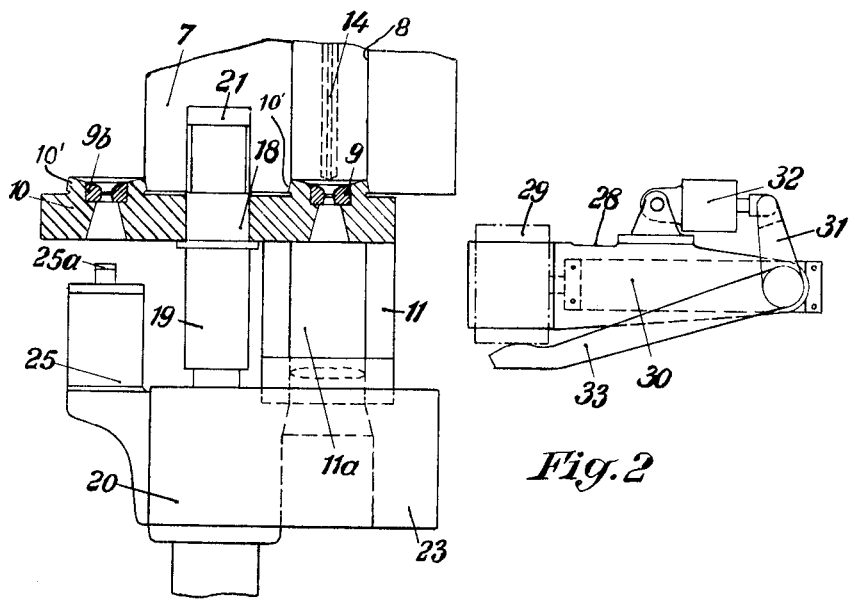
FIG. 2 is a horizontal section through part of the apparatus taken on line II—II of FIG. 1.
Figure 3:
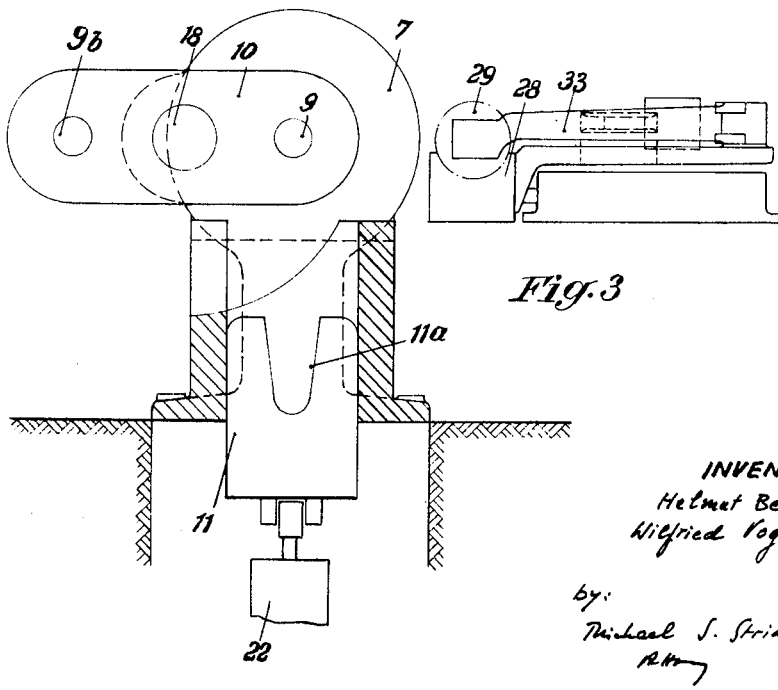
FIG. 3 is a cross section on line III—III of FIG. 1 with the closing wedge pulled out of its clamping position.

As shown particularly in FIGS. 2 and 3, the tool carrier 10 carrying the die 9 as well as an alternate or replacement die 9b is constructed as a two-armed lever and, through the intermediary of an axle 18 engaging a guide recess 21 in the press cylinder 7 is axially adjustable by means of a hydraulic cylinder 19 and at the same time pivotable in a plane perpendicular to the extrusion direction by means of a rotary drive 20, so that either of its conical guide portions 10′ surrounding the dies 9, 9b, respectively, can first be brought out of engagement with the pressure chamber 8 of the press cylinder 7 before it is turned for the purpose of exchanging the die 9 or for bringing the replacement die 9b into the extruding position after the tool carrier 10 has been swung.

In the extruding position the tool carrier 10 is supported by the closing wedge 11 likewise hydraulically actuated by means of a cylinder 22 and constructed in fork-shape with an upwardly opening recess 11a. The closing wedge 11 has a rear inclined surface which bears in clamping position against a counter wedge 24 fixed in an anchoring part 23 of the arrangement. On the anchoring part 23 a hydraulically operated ejector 25 is also mounted which has a ram 25a for ejecting the residue of extruded material out of that die which is located in inoperative position and if necessary also for pushing a die out of its bearing in the tool carrier 10 for the purpose of exchange. Finally the anchoring part 23 also serves for mounting a heating device 26 shown in FIG. 1 and also hydraulically adjustable in two planes at right angles to each other. The heating device has a high frequency heating conductor 27 serving for heating locally the extruded tube so as to permit parting the latter from the residue of material or tube remaining in the die.

In FIGS. 2 and 3 an auxiliary device is designated by 28 by means of which billet 29 formed as a hollow or perforated block can be automatically introduced into the pressing chamber 8 of the press cylinder 7. For this purpose the auxiliary device 28 is hydraulically actuated by a feed cylinder 30 in transverse direction as well as in axial direction by a pushing-in lever 33 associated therewith and pivotable by means of a lever system 31 and another hydraulic cylinder 32.

For fitting a new billet into the press the procedure is to first move the closing wedge 11 into its bottom position, then run back the tool carrier 10 with its conical guide part 10′ out of engagement with the open end of the pressure chamber 8 and then swing the tool carrier through 90° into vertical position. After the truncated conical ram head 12c has then been inserted the hollow billet 29 is moved forward to a position in front of the pressure chamber 8 by means of the auxiliary device 28 and pressed into the pressure chamber 8 by means of the pushing-in lever 33 and then the auxiliary device 28 with the pushing-in lever is run back into the receiving position. Thereupon the tool carrier 10 is again swung through 90° so that e.g. the die 9 is located in front of the pressure chamber and then the tool carrier and thus the respective conical guide portion 10′ is pushed forward by means of hydraulic cylinder 19 until it engages the open end of the pressure chamber 8. The mandrel rod 16 is then run-in by means of the driving rollers 17 and 17a moved into engagement therewith and then the driving rollers are again released into idle position as shown. Thereupon the closing wedge 11 is raised by means of cylinder 22 so that the tool carrier is locked against the counter wedge 24 and the anchoring part 23. After the billet 29 has been pressed home, the extrusion of the tube takes place by driving the press ram 12 forward. At the end of the extrusion operation the closing wedge 11 is again lowered into its bottom position, whereupon the loop-shaped high frequency heating conductor 27 open in downward direction is brought into heating position around the extruded tube, and the respective tube, after being heated, is torn off. When the heating conductor has been run back, the tool carrier is moved back and swung through 90° so that, after the ram head 12c has been pushed out and the press ram withdrawn, the pressure chamber can be cleaned and cooled before the same procedure is repeated. During the extrusion, the die and the residue of material are forced out of the arm of the tool carrier which is not in operative position by means of the ejector 25, 25a and then the replacement die 9a is fitted in the holder.

Figure 4:
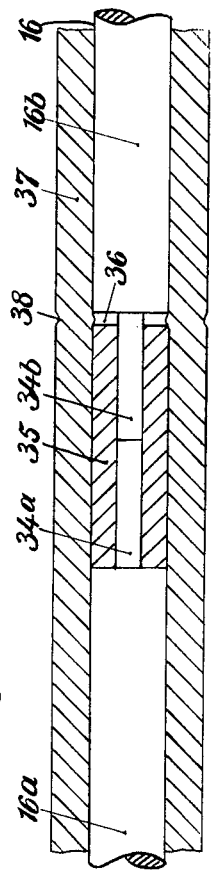
FIG. 4 is a longitudinal section through the joining point of two mandrel rod sections.

As can be seen from FIG. 4, the mandrel rod 16 is composed of separate sections 16a and 16b which have at their ends plugs 34a and 34b coupled together by means of a sleeve 35. The connecting sleeve 35 is of the same external diameter as the mandrel rod sections 16a and 16b but they leave free at one end an annular gap 36 with sharp edges between their end face and the end face of the adjacent mandrel rod section 16b opposite thereto, this gap effecting in the manner described above a constriction 38 on the tube 37 visible from the outer side during the extrusion process. In this manner it is always possible to find the joints of the rod sections easily so that the tube can be parted at these marked points without difficulty after being heated by the high frequency heating conductor and, after the separation, the particular section of the mandrel rod can be subjected in a length of only about 10 meters to the following reeling process for extracting the mandrel rod section therein. It is evident that the gap 36 may also be formed by an annular groove in each of the connecting sleeves 35 themselves seeing that the above-mentioned constriction 38 on the outer wall of the tube is formed automatically through shrinkage in the cooling stage during the extrusion process as the tube wall has no support on the inner side in the area of the gaps or grooves 36.

The hollow block-shaped billets 29 heated to a temperature of about 1200° C. can, in the case of an outer diameter of 200 mm. and a wall thickness of 40 mm., have an axial length of 300 mm. so that they do not weigh more than 47 kgs. If tubes with an external diameter of 70 mm. and a wall thickness of 10 mm. are, for example, to be produced from these billets, the finished tubes are made in lengths of only about 3.2 m. In this case it is possible to work with relatively short mandrel rods and the tubes can then be freed without difficulty from the mandrel rod by transverse rollers (reels) or the like in a subsequent operation.

If, on the other hand, diesel injection tubes or the like having an external diameter of 9 mm. with a wall thickness of 3 mm. and a weight of only about 0.45 kg. per meter length are to be produced from billets having the above-mentioned cross-sectional measurements, such as occur for example as intermediate products in continuous casting tube plants, tubes of such great length are obtained that they can no longer be reeled off a one-piece mandrel rod so that in such cases the above described composite mandrel rods must be used.

The process is preferably conducted in stages in such a manner that from a billet with 200 mm. external diameter, 40 mm. wall thickness and a length of 450 mm., and having a weight of about 71 kgs., first a tube about 1770 mm. in length with an external diameter of 90 mm. and a wall thickness of 25 mm. is extruded, whose useful length of about 1600 mm. (after deducting the extrusion residue) is divided into extruded sleeves about 400 mm. in length. Only in a subsequent operation are these extruded sleeves, which weigh about 16 kgs., further extruded to form the finished tubes with 9 mm. external diameter and 3 mm. wall thickness, producing tube lengths of about 36 meters.

We claim:
1. In an apparatus for converting axially perforated billets into tubes by extrusion pressing, in combination,
 (a) elongated pressure chamber means open at one end and adapted to accommodate an axially perforated billet;
 (b) die means having a die opening determining the outer contour and dimensions of a tube to be extruded;
 (c) tool holder means carrying said die means and being movable between an idle position and an operative position in which it substantially closes said one open end of said pressure chamber means and places said die means in operative position;
 (d) ram means in said pressure chamber means and movable therein in longitudinal direction for forcing the material of a billet lodged in said pressure chamber means through said die means when the latter are located by said tool holder means in said operative position;
 (e) guide tube means arranged stationarily in said pressure chamber means coaxially with said die opening when said die means are in said operative position, and extending longitudinally through said ram means and through an axially perforated billet when the latter is placed in said chamber means, said guide tube means having a forward free end spaced axially a predetermined distance from said die means and shaped to form together with the face thereof opposite thereto an admission funnel for the material of said billet to be forced through said die opening; and
 (f) mandrel rod means arranged to be freely slidable through said guide tube means and extending through said die opening so as to determine the inside contour and dimension of the tube to be extruded, said mandrel rod means comprising at least two sections introducible at the rear end of said guide tube means during the extrusion operation, and a sleeve coupling said sections together and having an outer diameter corresponding to the outer diameter of said mandrel rod sections, with an annular groove with sharply defined edges provided in the area of said sleeve
  whereby the mandrel rod means are carried along continuously by a tube being extruded and in continuous stationary contact with the inner surface thereof so as to prevent deterioration of said inner surface by contact with atmospheric air during the cooling off period following the passage through the die means and a constriction mark is caused to appear on the extruded tube in the area of said sleeve therein.

2. An apparatus as claimed in claim 1, wherein said annular groove is provided on the outside of said sleeve.

3. An apparatus as claimed in claim 1, wherein said annular groove is provided as an annular gap between one of the end faces of said sleeve and the end face of the respectively adjacent mandrel rod section opposite said one end face of said sleeve.

4. In an apparatus for converting axially perforated billets into tubes by extrusion pressing, in combination,
 (a) stationary elongated pressure chamber means having a predetermined inner diameter and being open at opposite ends and adapted to accommodate an axially perforated billet;
 (b) die means having a die opening determining the outer contour and dimension of a tube to be extruded;
 (c) tool holder means carrying said die means and being movable between an idle position laterally spaced from one of said open ends and an operative position in which it substantially closes said one open end of said pressure chamber means and places said die means in operative position;

(d) ram means into the latter having at least at a front portion thereof an outer diameter substantially equal to said predetermined inner diameter and extending with said front portion through the other open end of said pressure chamber means and being movable therein in longitudinal direction for forcing the material of a billet lodged in said pressure chamber means through said die means when the latter are located by said tool holder means in said operative position;

(e) guide tube means arranged stationarily in said pressure chamber means coaxially with said die opening when said die means are in said operative position, and extending longitudinally through said ram means closely spaced therein and through an axially perforated billet when the latter is placed in said chamber means, said guide tube means having a forward free end spaced axially a predetermined distance from said die means and shaped to form together with the face thereof opposite thereto an admission funnel for the material of said billet to be forced through said die opening; and (f) mandrel rod means arranged to be freely slidable through said guide tube means and extending through said die opening so as to determine the inside contour and dimension of the tube to be extruded, whereby the mandrel rod means are carried along continuously by a tube being extruded and in continuous stationary contact with the inner surface thereof so as to prevent deterioration of said inner surface by contact with atmospheric air during the cooling off period following the passage through the die means.

5. An apparatus as claimed in claim 4, wherein said guide tube means is axially adjustably mounted for the purpose of changing the spacing of said forward end thereof from said die means and thereby the dimension of said admission funnel.

6. An apparatus as claimed in claim 4, wherein said free end of said guide tube means is truncated cone-shaped so that said admission funnel narrows towards said die opening.

7. An apparatus as claimed in claim 4, wherein said die means are exchangeably mounted in said tool holder means.

8. An apparatus as claimed in claim 4, wherein a conical guide portion is provided on said tool holder means for closing said open end of said pressure chamber means, said tool holder means engaging said open end of the pressure chamber with said conical guide portion, said die means being lodged in said guide portion, said tool holder means being mounted to swing about a longitudinal axis in a plane transverse of the pressing direction and at least one wedge means serving to lock said tool holder means in said operative position.

9. An apparatus as claimed in claim 8, wherein said swingable tool holder means is composed of at least two arms for the purpose of receiving in said arms two interchangeable die means.

10. An apparatus as claimed in claim 9, wherein means are provided for automatically feeding and introducing a perforated billet into said pressure chamber means and also means for ejecting the extrusion material residue from said die means when moved out of operative position and also for ejecting a die means from said tool holder means when desired.

11. An apparatus as claimed in claim 4, wherein at least one heating device is provided and includes a high frequency conductor movable into heating position relative to an extruded tube for heating a selected area of the latter and enabling the same to be parted at the heated selected area.

References Cited by the Examiner

UNITED STATES PATENTS

| 79,548 | 7/68 | Chubbuck | 207—3 |
|---|---|---|---|
| 567,410 | 9/96 | Potter | 207—3 |
| 770,997 | 9/04 | Beck et al. | 207—3 |
| 1,812,686 | 6/31 | Crowdes | 207—4 |
| 2,031,008 | 2/36 | Schwerak | 207—3 |
| 2,133,874 | 10/38 | Sparks | 207—3 |
| 2,715,459 | 8/55 | Krause | 207—17 |
| 2,753,044 | 7/56 | Haendeler | 207—4 |
| 2,896,782 | 7/59 | Billen | 207—1.1 |
| 2,905,317 | 9/59 | Arenz | 207—3 |
| 2,919,039 | 12/59 | Hess et al. | 207—1.1 |
| 3,019,894 | 2/62 | Delcroix et al. | 207—1.1 |
| 3,073,442 | 6/63 | Muller et al. | 207—1.2 |

FOREIGN PATENTS 872,484   4/53   Germany.

CHARLES W. LANHAM, *Primary Examiner.*

RICHARD H. EANES, MICHAEL V. BRINDISI,
*Examiners.*